United States Patent
Kondo et al.

(10) Patent No.: US 6,504,591 B1
(45) Date of Patent: Jan. 7, 2003

(54) LIQUID CRYSTAL DISPLAY APPARATUS

(75) Inventors: Katsumi Kondo, Mito (JP); Yasushi Tomioka, Hitachi (JP); Takao Miwa, Hitachinaka (JP); Makoto Yoneya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/423,463

(22) PCT Filed: May 8, 1998

(86) PCT No.: PCT/JP98/02049

§ 371 (c)(1),
(2), (4) Date: Feb. 2, 2000

(87) PCT Pub. No.: WO98/52095

PCT Pub. Date: Nov. 19, 1998

(30) Foreign Application Priority Data

May 9, 1997 (JP) .............................. 9-119059

(51) Int. Cl.[7] ............................................. G02F 1/1337
(52) U.S. Cl. .................... 349/123; 349/141; 349/155; 349/156
(58) Field of Search ................. 349/123, 141, 349/155, 156

(56) References Cited

U.S. PATENT DOCUMENTS 5,995,186 A * 11/1999 Hiroshi ...................... 349/141
6,184,957 B1 * 2/2001 Mori et al. .................. 349/118

* cited by examiner

*Primary Examiner*—Kenneth Parker
*Assistant Examiner*—David Chung
(74) *Attorney, Agent, or Firm*—Antonelli, Terry, Stout & Kraus, LLP (57) ABSTRACT

In one pixel, a stepped difference portion having an inclination degree a/b is formed on an alignment control layer, the alignment control layer is made of a material in which a liquid crystal alignment capability is given according to a polarization light radiation, and according to the polarization light radiation the liquid crystal alignment capability is added in the vicinity of the stepped difference portion. A thick and transparent organic high molecular layer is interposed between the alignment control layer and a substrate and a close adhesion characteristic and a transparency characteristic can be made compatible therewith. Accordingly, a problem in which the manufacturing margin in an alignment processing is narrow can be solved, and generation of a display failure according to a fluctuation in the initial alignment direction can be reduced. In this way, a large size liquid crystal display apparatus having a high quality and in which the contrast ratio is heightened can be provided.

25 Claims, 7 Drawing Sheets

LIQUID CRYSTAL DISPLAY APPARATUS

TECHNICAL FIELD

The present invention relates to an in-plane switching (In-plane switching: IPS) system liquid crystal display apparatus in which the electric field is applied to a liquid crystal layer in substantially parallel direction against a substrate and a liquid crystal display apparatus is operated, in particular relates to a large size panel use structure having a good productivity of an alignment control layer.

BACKGROUND TECHNIQUE

A strong need for a large size, a wide viewing angle and a multi-color performance of a screen size of a liquid crystal display apparatus is heightened. As to a viewing angle characteristic necessary for the large size, many definitions exists which are as a range in which a half-tone level is not reversed, a range in which a brightness, a contrast ratio, and a color tone are not varied, etc.. In the multi-color display, it is necessary to heighten a respective color re-production and further it is necessary to improve drastically the viewing angle characteristic according to the above stated definitions. As the liquid crystal display being compatible with the wide viewing angle and the large screen, it has proposed a combination system (IPS-TFT-LCD) in which IPS liquid crystal and a thin layer transistor (Thin layer transistor TFT) (Oota et al, Proceeding of the Fifteenth International Display Research Conference (Asia Display '95; p.707) and a practical use of a monitor system in which a display screen size has diagonal 13.3 inches (corresponded to 15 type CRT) has started (Kondo et al, SID '96 Digest No.8.1).

However, to realize the practical use of IPS-TFT-LCD corresponded to a screen larger than more than 17 type which will be a main current in CRT after this, it is necessary to develop a large size panel use new structure and process. In the conventional technique, it does not refer to a method for adding a homogeneous alignment characteristic in a panel having a stepped difference structure which is a subject mater of the present invention.

In IPS-TFT-LCD, it accompanies the difficulty of an alignment processing. A margin of this is narrow remarkably in comparison with a conventional type TN (Twisted Nematic) system, in particular in normally open type TN system (at a low voltage side a bright display, at a high voltage side a dark display). The reasons for the narrow margin are three points of following items (1)–(3).

(1) Stepped Difference Structure

In IPS-TFT-LCD, in principle it is necessary to arrange many long and narrow electrodes (at the case may be, it is called as an inter digital electrode) having several microns order degree.

Accordingly, a fine stepped difference structure is formed. A largeness of the stepped difference is determined by a thickness of the electrodes and shapes of various kinds of layers which are formed on the electrodes, in ordinary it has more than 0.1 micron. At the most upper layer of these layers, a high molecular layer such as polyimide is formed as an alignment control layer (it is called as an alignment layer). In the conventional mass-production technique, a surface of this alignment control layer is carried out according to a rubbing processing and a liquid crystal alignment ability is added. On the other hand, the rubbing use cloth is constituted by binding narrow fibers having a thickness of 10–30 microns degree, substantially since every one narrow fiber gives the sharing force in a predetermined direction to a local portion of the alignment layer, a processing for adding the liquid crystal alignment ability is carried out. As the fibers, there is an extremely narrow fiber having several microns degree, however as the rubbing use fiber, however since the rigidity for adding the some degree friction force is required, it has not used practically. Since an electrode interval in IPS system is 10–30 micron degree same to that of a diameter of the above stated fiber, the rubbing at a vicinity of the stepped difference is not carried out fully, as a result the alignment is disturbed easily. The disturbance in the alignment causes a lowering in a picture quality such as a rise of a black level and a lowering in the contrast ratio according to the above stated rise, and a non-homogeneity in the brightness.

Figure 1:
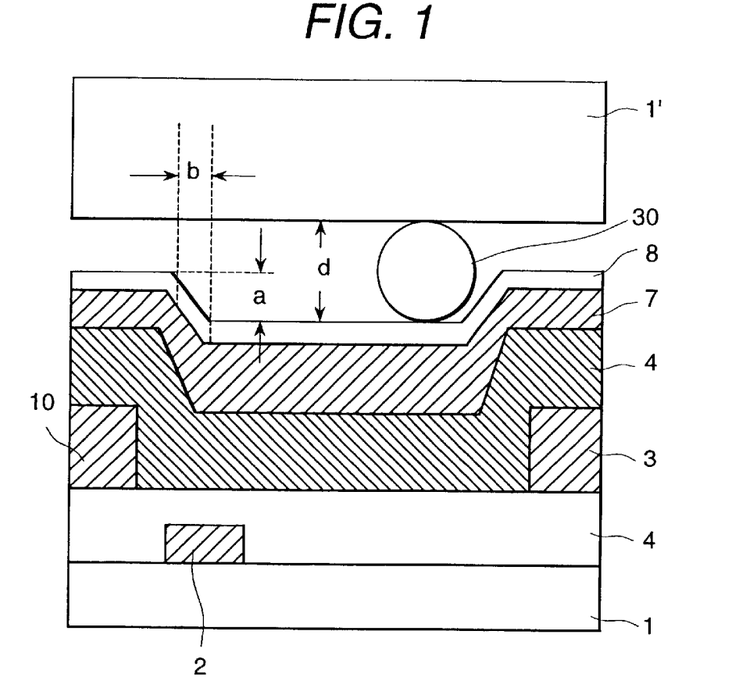
FIG. 1 is a view showing an insulation layer, a transparent organic high molecular layer, an alignment control layer in which a portion of a schematic cross-sectional view of FIG. 2 is enlarged.

As a method for solving the above stated problems, it has proposed a method for flattening a surface of the alignment layer, however the complete flattening manner invites following the side effects and this method is not used practically. A first is a problem which is caused by a phenomenon in which a spacer for controlling a liquid crystal layer at constant is moved easily. By the move of the spacer, a spacer distribution becomes up homogeneously and a liquid crystal layer thickness becomes non-homogeneously, accordingly the non-homogeneity of the brightness is invited. Further, during the spacer move the surface of the alignment layer is hurt and it causes a light leakage. From these points, it is necessary to have some degree stepped difference. Further, to solve the problem about the spacer move, it is desirable to form the stepped difference on one of a pair of substrates, in a case where TFT side is flattened and the stepped difference is tried to form to an opposite substrate side, it is necessary to pay an attention. In IPS system, to apply the effective in-plane switching, it is necessary to form, many thin and narrow shape inter digital electrodes, as a result many stepped differences are formed on the TFT side substrate. To dissolve the stepped differences it is effective to coat thick an organic high molecular layer, however when the thick insulation layer is formed on the electrode, it invites a lowering of the effective voltage which applies to the liquid crystal. As a result, a threshold voltage becomes high and it causes a problem in which since it is necessary to use driver having a high pressure withstand a consumption electric power becomes high. It is realistic to form the insulation layer having a proper thick to the TFT side substrate and to remain a proper stepped difference. As shown in FIG. 1, it is necessary to form a ratio a/d between the liquid crystal layer thickness d and the stepped difference a at least more than 0.02. In particular, for example, to drive the large size panel having diagonal size more than 18 inches, to restrain a deterioration of the voltage waveform from a driver LSI, it is necessary to lower the resistance value of the electrode, accordingly the electrode is necessarily to be formed thick. In the large scale panel, the stepped difference remains necessarily.

(2) Alignment Angle

In IPS-TFT-LCD, it is necessary to establish in principle an initial alignment direction to arrange a direction to which the electrode is extended, or by shifting with more than a constant angle from a vertical direction of the above stated direction. Herein, the electrode indicates a signal wiring electrode, a common electrode and a pixel electrode in a pixel. To regulate the initial alignment direction by the rubbing method, as stated in above, it is necessary to rub to a predetermined angle direction by the fibers having about 10–30 microns degree, by the stepped difference between the wiring being extended to the constant direction such as the signal wiring electrode, the common electrode in the pixel, and the pixel electrode in the pixel and the end portions thereof, it causes a problem in which the fibers are drawn into to the stepped difference direction from the design angle.

(3) Profound Degree of the Black Level

As one of the characteristics of IPS-TFT-LCD, it can enumerate that the profound of the black level (the black display) is good. Accordingly, the disturbance in the alignment comes to the fore in comparison with other systems.

In the conventional normally open type TN system, the dark level is obtained by the condition to which the high voltage is applied. In this case, under the high voltage almost liquid crystal molecular are all present to the electric field direction which is a vertical one direction to the substrate face, with the relationship between the liquid crystal molecular arrangement and a polarizing plate arrangement, the dark level can be obtained. Accordingly, the homogeneity of the dark level does not depend in principle on the initial alignment condition during the low voltage time. Further, the eyes of the human recognizes the roughness of the brightness as a relative ratio and further reacts near with a logarithms scale, accordingly it is sensitive to a fluctuation of the dark level. From the above stated view points, in the conventional normally open type TN system in which the liquid crystal molecular is arranged compulsively to one direction under a high voltage, it is insensitive to the initial alignment condition and it is in a better position than. On the other hand, in the in-plane switching system, to display the dark level at the low voltage or at the voltage of zero, it is sensitive to the disturbance of the initial alignment condition. In particular, an arrangement (it is called as a bi-refraction mode) in which a homogenous arrangement where the liquid crystal molecular alignment direction is in parallel each other on an upper substrate and a lower substrate is formed and also a light transmission axis of one polarizing plate is formed in parallel to the liquid crystal molecular alignment direction and that of another polarizing plate is formed in orthogonally, in a polarization light which is incident to the liquid crystal layer a linear polarizing light is propagated without the disturbance. This is effective to be profound in the dark level.

A transmission rate T of the bi-refraction mode is expressed by a following formula (1).

$$T=To\times\sin^2\{2\theta(E)\}\times\sin^2\{\Pi\times\text{deff}\times\Delta n/\lambda\}. \quad (1)$$

Herein, To is a coefficient and is a numeral value which is determined mainly by a transmission rate of the polarizing plate used in the liquid crystal panel, $\theta(E)$ is an angle making by the alignment direction (an effective light axis of the liquid crystal layer) of the liquid crystal molecular and the polarization light transmission axis, E is an application electric field strength, deff is an effective thickness of the liquid crystal layer, $\Delta n$ is a refraction rate aeolotropic characteristic, and $\lambda$ is a wavelength of the light. Further, herein, a product the effective thickness deff of the liquid crystal layer by the refraction rate aeolotropic characteristic $\Delta n$, namely (deff$\times\Delta n$), is called as a retardation. Further, the thickness deff of the liquid crystal layer is not a whole thickness of the liquid crystal layer but when the voltage is applied it indicates a thickness of the liquid crystal layer for changing practically the alignment direction. Because the liquid crystal molecular at a vicinity of an interface of the liquid crystal layer does not change the alignment direction when the voltage is applied according to an affect of an anchoring of the interface. Accordingly, when the thickness of the whole liquid crystal layer which is sandwiched by the substrates is expressed by dLC, between this thickness dLC and the thickness deff, it has always a relationship deff<dLC and this difference differs from the liquid crystal material used in the liquid crystal panel, and the interface for contacting the liquid crystal layer, for example, the kinds of the alignment layer materials, and it can be estimated to have in general 20–40 nm degree.

As clearly understood from the above stated formula (1), the matter for depending to the electric field strength is $\sin^2\{2\theta(E)\}$ item and by changing angle $\theta$ in response to the electric field strength E the brightness can be adjusted. To form the normally close type, under the voltage non-application time, since the polarizing plate is established to have $\theta=0$ degree, it works to be sensitive to the disturbance of the initial alignment direction.

(4) Problems of the Photo-alignment Method

As explained in a latter portion, as to the problems from (1) to (3), it is possible to solve by an introduction of the photo-alignment method in place of the conventional rubbing method. The photo-alignment method is classified largely a photo-dissolution type and a photo-reaction type. In both cases, from a practical use there are following problems. To perform the close adhesion characteristic improvement between the alignment layer material and the substrate it is necessary to have some degree thickness, however in this case it is difficult to have the compatibility between the photo-reaction characteristic and the transparency characteristic. In a case the bad coloring is invited and the utilization efficiency of the light and the picture quality lower. The assurance between the close adhesion characteristic between the alignment control layer and the substrate is important in the practical use, and the success or the failure of the photo-alignment is essential.

Further, as stated in above, to adopt the photo-alignment to the substrate having the stepped difference structure, it is necessary to pay consideration to the following points. In the photo-alignment method, to a whole face of the alignment layer, the light having an ability for reforming a surface, for example as the ultra-violet light, is irradiated, in this case since the reflection of the light is caused at the stepped difference portion, it is necessary to pay consideration to the light course. It is desirable to have a modulated and inclined taper structure as the stepped difference. In a case when the ratio a/b of the parameter shown in FIG. 1 is less than 1 (in the inclination angle, less than 45 degree), the refection light at the taper portion is not reached to a pixel portion, accordingly it does not cause the alignment failure.

DISCLOSURE OF THE INVENTION

An object of the present invention is to provide in particular a large size liquid crystal display apparatus wherein the problem in which a manufacture margin is narrow in an alignment processing being a specific problem in IPS-TFT-LCD stated in above can be solved and a high quality picture quality in which a contrast ratio is heightened can be obtained and a generation of a display failure according to a fluctuation of an initial alignment direction can be reduced.

According to the present invention, in an active matrix type in-plane switching liquid crystal display apparatus in which at least one of a pair of substrates is transparent, a thickness of a liquid crystal layer is controlled to have a substantially constant thickness by a spacer which is dispersed and sandwiched between the pair of substrates, on a surface at a side for contacting at least one liquid crystal layer of the pair of substrates, an inclination degree a/b of a stepped difference portion having an alignment control layer which is formed on a surface of a display pixel is less than 1, and the alignment control layer is made by a material which is enable to give a liquid crystal alignment ability according to a polarization light radiation, and the liquid crystal alignment ability has at a vicinity of the stepped difference portion.

According to the present invention, during the formation of the alignment control layer of the panel having the stepped difference structure the manufacture margin can be enlarged and as a result it is possible to provide the large size liquid crystal display apparatus in which the initial alignment direction is formed homogeneously and the high quality picture quality can be obtained. In the conventional rubbing method, the end portion of the stepped difference works as a guide of the rubbing use cloth fibers and the fibers are drawn into the extension direction of the stepped difference and to the corner portions of the stepped difference the fibers do not reach, accordingly it is impossible to carry out the alignment processing and the alignment failure causes. On the other hand, according to the present invention, since the alignment ability is added by the polarization light radiation, in regardless the shapes the polarization light having the constant direction can be radiated to the minute portions, as a result the liquid crystal alignment direction is formed homogeneously. Further, the stepped difference structure can be formed at the substrate side having the electrodes group or at the opposed side substrate in which in commonly the color filter is formed. In particular, when the black matrix formed to the boundary portion of the color filter is made by the resin material and the black color paints, to make thicker this black matrix portion than the pixel portion in which the light is transmitted, the stepped difference is formed easily, and the present invention can work effectively. In reversely, when the black matrix is made by the metal thin layer material such as chromium, the black matrix portion become thin relatively. In this case, also the present invention can work effectively. Further, IPS liquid crystal, as clearly understood from the formula (1), since the liquid crystal layer thickness deff for giving the maximum transmission rate differs from every the waveform λ of the light, and since the stepped difference is caused in a case where the liquid crystal thickness deff is changed at every color of the color filter, the present invention can work effectively. Further, when the dielectric rate aeolotropic characteristic is positive and also the angle making by the alignment direction of the electric field non-application time on the alignment control layer and the electric field direction is 45–88 degree and when the dielectric rate aeolotropic characteristic is negative and also the angle making by the alignment direction of the eclectic field non-application time on the alignment control layer and the electric field direction is 2–45 degree, in particular the present invention can work effectively.

Further, according to the present invention, in an active matrix type in-plane switching liquid crystal display apparatus in which between in a pair of substrates which at least one is transparent the liquid crystal layer is sandwiched, it is effective when the spacer having the regularity characteristic to the non-transparent portion of the pixel is formed in place of the dispersed spacer. In this spacer having the regularity characteristic can be formed, for example, according to a photo-lithography process. Naturally, since the spacer exists, it is necessary to form the stepped difference having the large size such as 2–5 microns degree and it is difficult to adopt the rubbing method.

Further, in particular it is necessary to pay the consideration about the problems of the close adhesion characteristic between the photo-reaction type alignment layer material and the substrate and the coloring characteristic. As to those problems, it can be solved by the intervene the transparent organic high molecular layer having the thickness thicker than the alignment control layer between the alignment control layer and the substrate. It is a desirable to have a value of 0.2–3 microns as the thickness of the transparent organic high molecular layer and it is a desirable to have a value of 0.01–0.1 microns as the thickness of the alignment control layer. The close adhesion characteristic is further strengthened by the addition of the adhesion promotion agent for heightening the close adhesion characteristic of the substrate face and the alignment control layer to the organic high molecular layer. Since the organic high molecular layer has some degree thickness, this works to reduce the deterioration caused by the temperature change etc. Further, more desirably when both of the alignment control layer and the transparent organic high molecular layer are made of polyimide, since they are the same system materials, the close adhesion characteristic can be further strengthened. When the transparent organic high molecular layer is made by amorphous material, since the whole face of the layer face presents homogeneous state, the reduction in the deterioration and the improvement in the close adhesion characteristic can be obtained. Further, to form thick the above stated transparent organic high molecular layer, polyamic acid having the concentration of more than 8% is coated, after that it is desirable to heat the temperature where the imization proceeds some degree, and to form thin the alignment control layer after soluble polyimide or polyamic acid has coated, it is desirable to heat the temperature where the solvent agent evaporates. In case of polyamic acid, it is desirable to rise to the temperature where the imization proceeds.

BEST MODE FOR CARRYING OUT THE INVENTION

Hereinafter, a concrete construction of embodiments will be explained.

Embodiment 1

Figure 2:
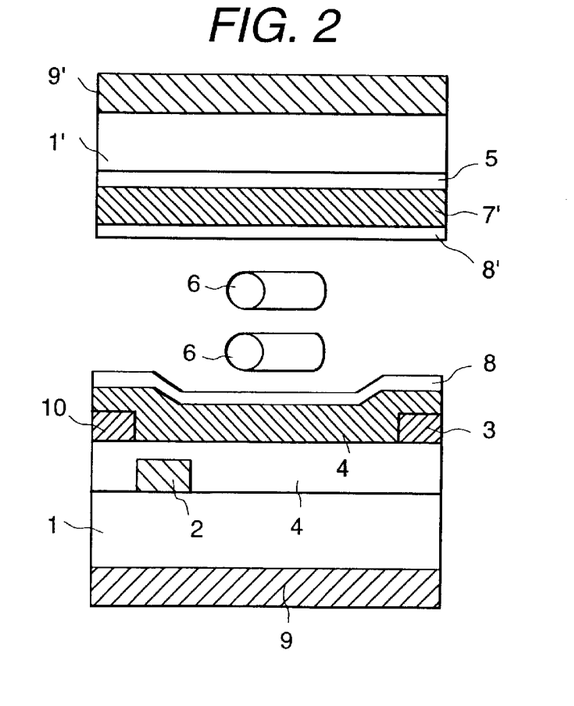
FIG. 2 is a view showing a cross-sectional view of a cell of a liquid crystal display apparatus according to the present invention.

In FIG. 2, a schematic cross-sectional view of a cell of a liquid crystal display apparatus of this embodiment is shown. Between a pair of transparent substrates 1, 1' is sandwiched by a liquid crystal layer 32 in which plural compounds are composed. In FIG. 2, it shows schematically by a rod shape liquid crystal molecular 5. On both outer sides of the pair of substrates 1, 1', polarizing plates 9, 9' are arranged. On a face of a cell inner side of one substrate 1 stripe shape electrodes 2, 3 are formed, on the above this an insulation layer 4 is formed, further on the above this an alignment control layer 8 is formed. The electrode 2 is a common electrode to which a constant waveform voltage which does not depend on an image signal is applied, and the electrode 3 is a pixel electrode in which the waveform changes to in response to the image signal. Further, at the same height of the pixel electrode 3 an image signal electrode 10 is arranged. Both the thicknesses of the pixel electrode 3 and the image signal electrode 10 are 0.2 microns. The insulation layer 4 has two layers and each of layers comprised of silicon nitride layer and both the thickness are 0.4 microns. To the opposed another substrate, a color filter 5 for carrying out the color display is formed.

FIG. 1 is a schematic view in which a layer construction at a periphery of the electrode group shown in FIG. 2 is shown in detail. On the insulation layer 4 which covers the electrodes 3, 10 a transparent organic high molecular layer 7 is coated, further on the above this the alignment control layer 8 is coated. The thickness of the transparent organic high molecular layer and the alignment control layer is 0.2 microns and 0.03 microns, respectively. A stepped difference a is 0.25 microns. Further, a width b of a taper portion is 0.35 microns, a ratio a/b is 0.71. A thickness d of the liquid crystal layer is 4.0 microns, a ratio a/d is 0.0625.

As the transparent organic high molecular layer, the polyamic acid solution of PIQ-1800 made by Hitachi Chemical Company Ltd. which is the amorphous layer having the concentration of 8.5% is coated, after the solvent agent is dried by heating to the temperature 150° C. during 10 minutes and polyamic acid solution being a precursor of the alignment control layer 8 and having the concentration 3% is coated. To the polyamic acid solution made by Hitachi Chemical Company Ltd., as an adhesion promotion agent, 2 weight % γ-amino propyl thriethoxy silane is mixed. Further, as the adhesion promotion agent for promoting the close adhesion characteristic, it is not limited to this but following materials can be employed. For example, 4-amino phenoxy dimethyl dimarthy vinyl silane, amoni methyl trimethy silane, 2-amino propyl dimethyl ethoxy silane, 3-amino propyl dimethyl ethoxy silane, methyl tris (2-amino ethoxy) silane, 3-amino propyl diethoxy methyl silane can be employed. After that the braking at 200° C., during 30 minutes is carried out and the imidization is carried out. Further, the precursor of the alignment control layer 8 is polyamic acid being the polyimide precursor and as the monomer component as diamine compound matter in which a chemical formula 1 including diazobenzene groups and 4–4' diamino diphenyl methane etc. is mixed with an equal mol ratio is used and to dianhydride compounds pyromellic dianhydride and 1, 2, 3, 4-cyclo butane-tetracarboxylic dianhydrides as the polyamic acid is composed.

chemical formula 1

Further, in this embodiment, azobenzene groups as described in U.S. Pat. No. 4,974,941 is introduced and photo-isomerization reaction characteristic is added, however it is not limited this however it can employ a substance having photo-isomerization reaction characteristic and the liquid crystal alignment is controlled. For example, such as a stilbene groups can be employed. In this embodiment, after two layers polyimide precursor layer has formed, the imidization is carried out according to the heat baking. After that, high molecular beads which are dispersed in methanol and have a particle diameter of 4.2 microns are dispersed in a solution condition. Since the dispersion medium is alcohol, it can evaporate within one minute and only spacer beads are remained. The dispersion density is about 100 numbers per 1 mm². After that, the upper and lower substrates are overlapped and are assembled to an empty cell condition using a sealing member to a peripheral portion.

Figure 3:
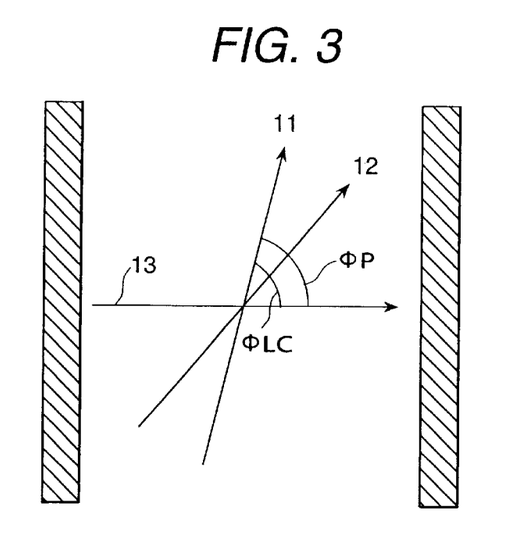
FIG. 3 is a view showing an angle by making a respective liquid crystal molecular long axis alignment direction against to an electric field direction and a respective polarizing plate polarization light transmission axis.

After that, under a high pressure mercury lamp having a peak of the wavelength of 436 nm as a light source, a polarization light is radiated from an outside of a cell through a polarization film which transmits the light having the wavelength of 400 nm. A radiation luminous energy is about 2J/cm². After that, the liquid crystal composition matter is encapsulated under the room temperature, further after that an annealing at 100° C. and during 10 minutes is carried out, the liquid crystal alignment is obtained to a substantially vertical direction against to the above stated radiation polarization direction. As to the liquid crystal molecular long axis at the obtained alignment condition, an angle ΦLC which is defined in FIG. 3 is 75 degrees. As stated in above, the liquid crystal display apparatus having the thickness d of the liquid crystal layer of 4.0 μm can be obtained. As the liquid crystal composition, nematic liquid crystal in which the dielectric aeolotropic characteristic is positive. A value of Δ∈ is 10.2 and the refraction ratio aeolotropic characteristic Δn is 0.073.

Figure 4:
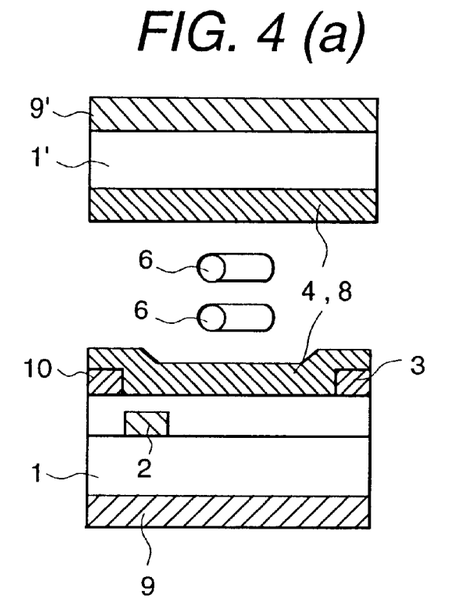
FIG. 4 is a schematic view showing an operation principle of the liquid crystal in an in-plane switching system liquid crystal display apparatus.

FIG. 4 shows a switching principle of the liquid crystal molecular in the panel obtained by the above. In this embodiment, as to the liquid crystal molecular 6, during the electric field non-application time, against to the vertical direction to the longitudinal direction of the stripe shape electrode, it is formed ΦLC=75 degrees, however when the dielectric rate aeolotropic characteristic is positive, it can be formed 45 degrees ≦ ΦLC<90 degrees. As the liquid crystal composition shown in FIG. 4, it can be formed with the dielectric aeolotropic having the negative. In this case, the initial alignment condition is aligned to 0 degree ≦ ΦLC<45 degrees from the vertical direction of the stripe shape electrode. In FIG. 4, an alignment direction 11 is shown with an arrow mark. Next, as shown in FIG. 4(b), (d), between the electrodes 2, 3 the electric field 13 is applied, to arrange the direction of the electric field 13 to the molecular long axis in parallel the liquid crystal molecular 6 changes the direction. In this time, θ in the formula (1) is changed in response to the electric field strength E and then the transmission rate is changed.

In this embodiment, since the display system having bi-refraction mode is employed, the liquid crystal is sandwiched between the orthogonal polarizing plates. Further, to obtain the normally open type characteristic which presents the dark display at the low voltage, the polarization transmission axis of one polarizing plate is formed orthogonal to the initial alignment direction. The transmission light strength to be observed is determined by the formula (1).

Figure 5:
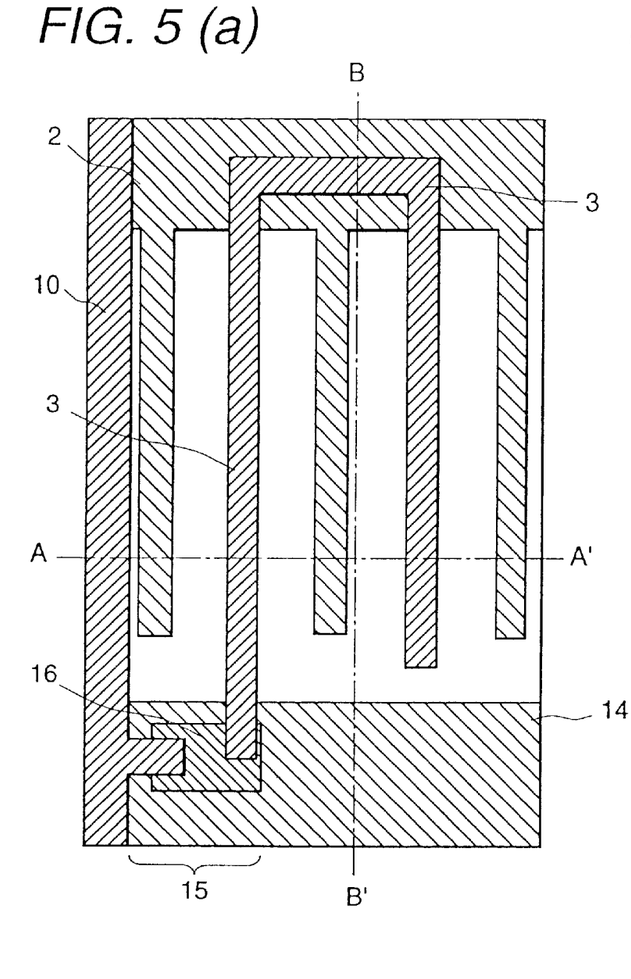
FIG. 5 is a schematic view showing a plan view and a cross-section of an arrangement of an electrodes group of a unit pixel portion shown in Embodiment 1, an insulation layer, and an alignment control layer.

FIG. 5 shows an arrangement of the electrodes group, the insulation layer, the alignment control layer in the unit pixel according to the present invention. FIG. 5(a) is a front view which is viewed from the vertical direction to the panel face, FIGS. 5(b), (c) are views showing a side face cross-section.

Figure 6:
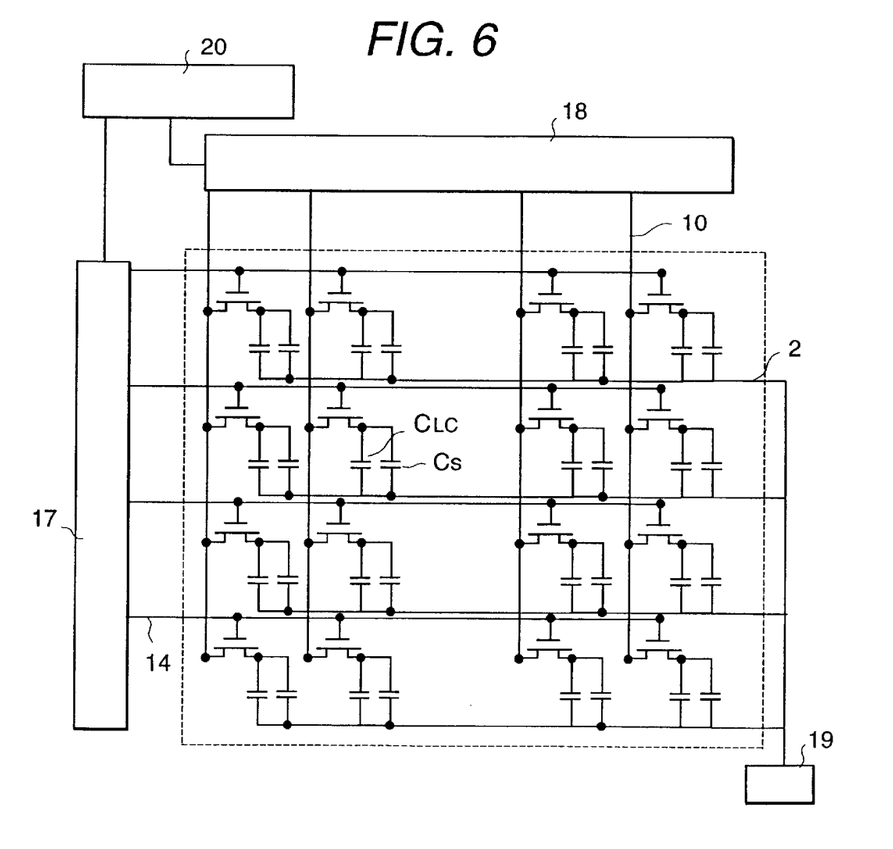
FIG. 6 is a view showing an example of a circuitry system structure in a liquid crystal display apparatus according to the present invention.

FIG. 6 shows a circuitry system structure in the liquid crystal display apparatus according to this embodiment. The apparatus is constituted by a vertical scanning signal circuit 17, an image signal circuit 18, a common electrode drive use circuit 19, a power supply and a controller 20, however the present invention is not limited to this structure.

Figure 7:
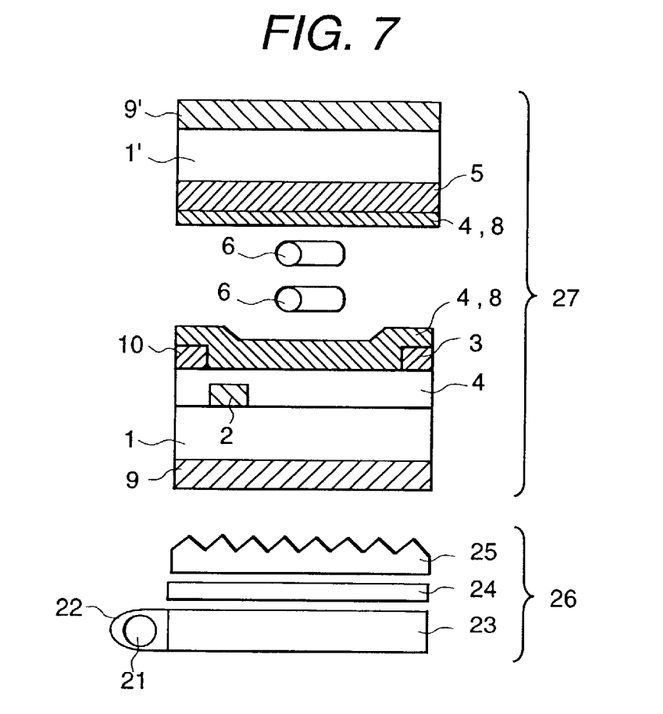
FIG. 7 is a view showing an example of an optical system structure in a liquid crystal display apparatus according to the present invention.

FIG. 7 shows an optical system system structure in the liquid crystal display apparatus according to this embodiment. To a back face of a liquid crystal panel 27, a back-light unit 26 is provided, such unit is comprised of a light source 21, a light cover 22, a photo-conductive body 23, and a diffusion plate 24. Herein, a prism sheet 25 for increasing a front face brightness is provided, however the provision of this sheet takes no notice. Preferably, this sheet can be omitted from the reduction of the viewing angle dependency characteristic of the brightness.

With the above stated structure, IPS-TFT-LCD having the diagonal angle is 13.3 inches, the pixel number of 1.024×RGB×768 is manufactured for trial, the contrast ratio exceeds over 300 extending over a whole face and further the liquid crystal display apparatus having a good display homogeneity characteristic can be obtained.

Comparison Example

This example differs merely that in place of the photo-alignment method as the photo-alignment control method in Embodiment 1, the rubbing method is used. As the monomer component, as diamine compounds, 4–4' diamine diphenyl methane is used but the material having the photo-reaction characteristic is not used.

With the above structure, when IPS-TET-LCD having the same size to Embodiment has manufactured in trial, the light leakage accompanying with the disturbance of the alignment has observed at the stepped difference portion. As a result, the non-homogeneity of the contrast ratio has observed and in the low portion it is 80 and at the high portion it has remained 180 degree.

Embodiment 2

Against to Embodiment 1, following points differ.

Figure 8:
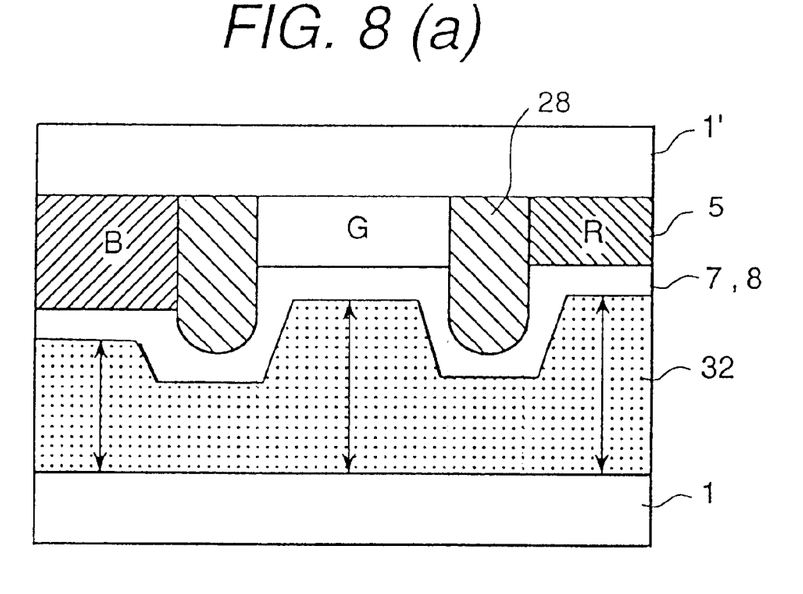
FIG. 8 is a view showing one example of a structure in which a stepped difference is provided at a color filter side according to the present invention.
Figure 9:
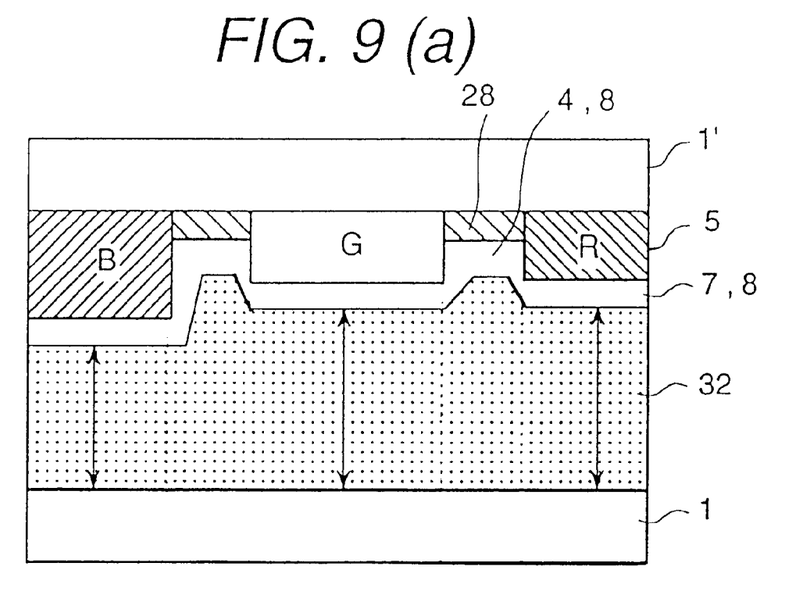
FIG. 9 is a view showing another example of a structure in which a stepped difference is provided at a color filter side according to the present invention.
Figure 10:
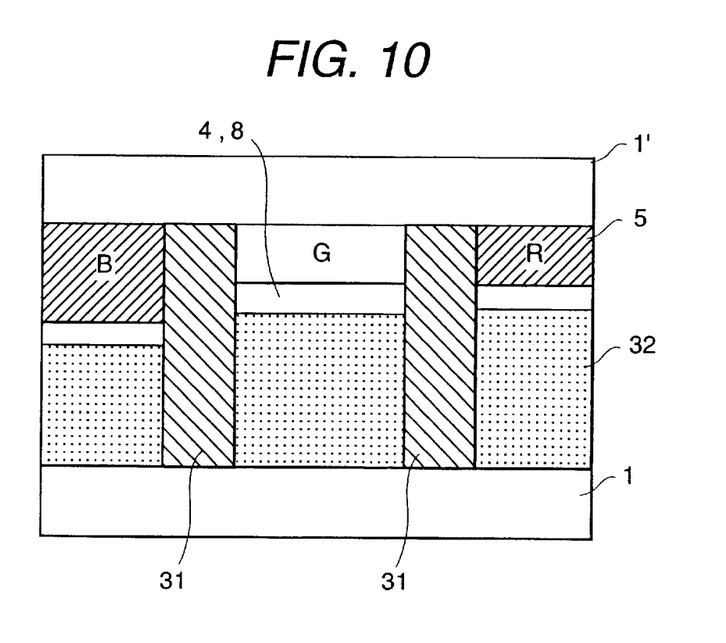
FIG. 10 is a view showing one example of a structure in which a spacer is formed to have the regularity to a non-transparent portion of a pixel.

On the other substrate which is arranged oppositely to the substrate having the electrodes group, the stepped difference structure is added. Further, to this opposite substrate the color filter is formed and at the boundary portion of the three primary colors being red (R), yellow (Y) and blue (B) the black matrix being a mixture matter of the resin material and the black color paints is formed. The structure is shown in FIG. 8. The thickness of the black matrix is thicker than all of the primary colors color filter portion. On the black matrix and the primary colors color portion, similarly to the electrode side substrate of Embodiment 1, the alignment control layer 8 which is added the liquid crystal alignment ability according to the transparent organic high molecular layer 7 and the polarization light radiation is coated. Further, as explained in the formula (1), since the liquid crystal layer thickness for giving the maximum transmission rate differs every color, in this embodiment to make thin the liquid crystal layer of the blue pixel which utilizes the light having the short wavelength the thickness of the color filter is formed thick with 0.02 microns degree. In this case, the stepped difference a at the surface of the alignment control layer 8 is 0.5 microns at maximum. Further, the width b of the taper portion is 0.6 microns and the ratio a/b is 0.83. The thickness d of the liquid crystal layer is 3.3 microns and the ratio a/d is 0.15.

With the above structure, in similarly when IPS-TFT-LCD having the diagonal angle is 13.3 inches, the pixel number of 1.024×RGB×768 is manufactured for trial, the contrast ratio exceeds over 300 extending over a whole face and further the liquid crystal display apparatus having a good display homogeneity characteristic can be obtained.

Embodiment 3

In Embodiment 2, the thickness of the black matrix is thicker than all of the primary colors color filter portion, but in this embodiment in reversely the black matrix portion is formed to have the most thin portion. The other points except the above are same to Embodiment 2. As to the black matrix use material, a low reflection type three layers chromium layer is used. In this case, the stepped difference a at the surface of the alignment control layer 8 is 0.15 at the maximum. Further, the width b at the taper portion is 0.8 and the ratio a/b is 0.19. The thickness d of the liquid crystal layer is 4.2 microns and the ratio a/d is 0.036.

With the above structure, in similarly when IPS-TFT-LCD having the diagonal angle is 13.3 inches, the pixel number of 1.024×RGB×768 is manufactured for trial, the contrast ratio exceeds over 300 extending over a whole face and further the liquid crystal display apparatus having a good display homogeneity characteristic can be obtained.

Embodiment 4

In Embodiments 1–3, as the spacer the high molecular beads are obtained by the dispersion, but in this embodiment, according to the photo-lithography process on the black matrix the pillars having the height of 2.9 microns with the regularity. The maximum stepped difference a of the pixel portion is 0.15 microns. Further, the width b of the taper portion is 0.20 microns and the ratio a/b is 0.75. The thickness d of the liquid crystal layer is 2.9 which is same to that of the height of the pillar and the ratio a/d is 0.052.

With the above structure, in similarly when IPS-TFT-LCD having the diagonal angle is 13.3 inches, the pixel number of 1.024×RGB×768 is manufactured for trial, the contrast ratio exceeds over 300 extending over a whole face and further the liquid crystal display apparatus having a good display homogeneity characteristic can be obtained.

According to the present invention, the problem where manufacture margin of the alignment processing is narrow, this is the specific problem in IPS-TFT-LCD in which to the substrate the electric field is applied in the substantial parallel direction and the liquid crystal is operated can be solved. Further, at the same time it is possible to provide the liquid crystal display apparatus having the high picture quality in which the generation of the display failure according to the fluctuation of the initial alignment direction can be reduced. Accordingly, in particular it is possible to provide the practical use of the large size high picture quality liquid crystal display apparatus.

What is claimed is:

1. A liquid crystal display apparatus comprising:
   a pair of substrates, at least one of which is transparent;
   a liquid crystal layer arranged between said pair of substrates;
   a plurality of electrodes formed on one substrate of said pair of substrates for applying an electric field substantially in parallel to a face of said substrate, and plural active elements connected to these electrodes;
   an alignment control layer formed on a face of at least one of said pair of substrates and being in contact with said liquid crystal layer; and
   optical means for changing an optical characteristic in response to a molecular alignment condition of said liquid crystal layer; wherein
   the thickness of said liquid crystal layer is set to a substantially constant thickness by spacers, which are dispersed and sandwiched between said pair of substrates, and a surface of the alignment control layer on said at least one of said pair of substrates which is in contact with said liquid crystal layer has stepped difference portions;
   on a surface formed in a display pixel, an inclination degree of a stepped difference portion in said alignment control layer is less than 1, and said alignment control layer is made of a material which is able to give a liquid crystal alignment capability according to a polarization light radiation in a vicinity of said stepped difference according to said polarization light radiation.

2. A liquid crystal display apparatus according to claim 1, characterized in that
   a ratio a/d between a height a of said stepped difference portion and a thickness d of said liquid crystal layer has a range of 0.02–1.

3. A liquid crystal display apparatus according to claim 1 or claim 2, characterized in that
   said substrate having said surface in which said stepped difference portion is formed within said pair of substrates is the substrate having said plurality of electrodes.

4. A liquid crystal display apparatus according to claim 1 or claim 2, characterized in that
   said substrate having said surface in which said stepped difference portion is formed within said pair of substrates is the other substrate which is arranged opposite to said substrate having said plurality of electrodes.

5. A liquid crystal display apparatus according to claim 4, characterized in that
   on said other substrate a color filter having plural different colors is formed.

6. A liquid crystal display apparatus according to claim 5, characterized in that
   said stepped difference portions are formed in the vicinity of a black matrix which is formed on a boundary of said color filter having plural different colors.

7. A liquid crystal display apparatus according to claim 6, characterized in that
   said black matrix is comprised of a resin material and black color paints and has a thickness greater than the thickness of a pixel portion in which the light is transmitted.

8. A liquid crystal display apparatus according to claim 5, characterized in that
   a liquid crystal layer thickness of said pixel portion differs from the thickness of said color filter having plural different colors.

9. A liquid crystal display apparatus according to claim 1 or claim 2 characterized in that
   a dielectric rate aeolotropic characteristic of said liquid crystal layer is positive, and an angle forming an alignment direction with an electric field direction during an electric field non-application time of said alignment control layer of said liquid crystal layer is 45–88 degrees.

10. A liquid crystal display apparatus according to claim 1 or claim 2 characterized in that
    a dielectric rate aeolotropic characteristic of said liquid crystal layer is negative, further an angle forming an alignment direction with an electric field direction during an electric field non-application time of said alignment control layer of said liquid crystal layer is 2–45 degrees.

11. A liquid crystal display apparatus, comprising:
    a pair of substrates, at least one of which is transparent;
    a liquid crystal layer arranged between said pair of substrates;
    a plurality of electrodes formed on one substrate of said pair of substrates for applying an electric field substantially in parallel to a face of said substrate, and plural active elements connected to these electrodes;
    an alignment control layer formed on a face of at least one of said pair of substrates and being in contact with said liquid crystal layer; and
    optical means for changing an optical characteristic in response to a molecular alignment condition of said liquid crystal layer; wherein
    the thickness of said liquid crystal layer is set to a substantially constant thickness spacers, which are formed in a non-transparent portion of a pixel;
    on a surface formed in a display pixel, an inclination degree of a stepped difference portion in said alignment control layer is less than 1, and said alignment control layer is made of a material which is able to give a liquid crystal alignment capability according to a polarization light radiation in substantially the whole of a display area in the vicinity of said stepped difference according to said polarization light radiation.

12. A liquid crystal display apparatus according to claim 11, characterized in that
    said spacers are formed according to a photo-lithography process.

13. A liquid crystal display apparatus according to claim 12, characterized in that
    said spacers are formed on a black matrix.

14. A liquid crystal display apparatus according to any one of claims 1, 2, 11, 12 and 13, characterized in that
    said alignment control layer has a photo-isomerization reaction characteristic.

15. A liquid crystal display apparatus according to claim 14, characterized in that
    said alignment control layer has one of azobenzene groups and stilbene groups.

16. A liquid crystal display apparatus according to claim 14, characterized in that
    between said alignment control layer and said substrate having said alignment control layer, there is an organic high molecular layer having a thickness greater than that of said alignment control layer and which is transparent.

17. A liquid crystal display apparatus according to claim 16, characterized in that said organic high molecular layer has an adhesion promotion agent which promotes a close adhesion characteristic between said substrate face and said alignment control layer.

18. A liquid crystal display apparatus according to claim 16, characterized in that the thickness of said transparent organic high molecular layer is 0.2–3 microns, and the thickness of said alignment control layer is 0.01–0.1 microns.

19. A liquid crystal display apparatus according to claim 16, characterized in that each of said alignment control layer and said transparent organic high molecular layer is comprised of polyimide.

20. A liquid crystal display apparatus according to claim 19, characterized in that said transparent organic high molecular layer is made by amorphous material.

21. A liquid crystal display apparatus according to claim 19, characterized in that said transparent organic high molecular layer is formed by heating it to a temperature where polyamic acid having a concentration of more than 8% is heated to proceed at least partially to an imidization.

22. A liquid crystal display apparatus according to claim 19, characterized in that said alignment control layer is formed by coating where a soluble polyimide having a concentration of 0.5–6% or polyamic acid is coated and by heating it to a temperature where at least a solvent agent is evaporated.

23. A liquid crystal display apparatus according to claim 18, characterized in that said transparent organic high molecular layer is made by amorphous material.

24. A liquid crystal display apparatus according to claim 20, characterized in that said transparent organic high molecular layer is formed by heating it to a temperature where polyamic acid having a concentration of more than 8% is heated to proceed at least partially to an imidization.

25. A liquid crystal display apparatus according to claim 20, characterized in that said alignment control layer is formed by coating where a soluble polyimide having a concentration of 0.5–6% or polyamic acid is coated and by heating it to a temperature where at least a solvent agent is evaporated.

* * * * *